United States Patent
Marking

[19]

[11] Patent Number: 6,135,434
[45] Date of Patent: Oct. 24, 2000

[54] SHOCK ABSORBER WITH POSITIVE AND NEGATIVE GAS SPRING CHAMBERS

[75] Inventor: John Marking, El Cajon, Calif.

[73] Assignee: Fox Factory, Inc., San Jose, Calif.

[21] Appl. No.: 09/231,257

[22] Filed: Jan. 15, 1999

Related U.S. Application Data

[60] Provisional application No. 60/073,478, Feb. 3, 1998.
[51] Int. Cl.[7] ................................. F16F 9/02; F16F 5/00
[52] U.S. Cl. ................. 267/64.26; 188/315; 188/322.16
[58] Field of Search ..................... 267/33, 34, 35, 267/64.11, 64.26; 188/315, 317, 322.16

[56] References Cited

U.S. PATENT DOCUMENTS

| | | |
|---|---|---|
| D. 391,530 | 3/1998 | Turner . |
| 3,272,495 | 9/1966 | Axthammer ........................ 188/315 |
| 3,794,309 | 2/1974 | Chrokey et al. ........................ 267/34 |
| 4,132,395 | 1/1979 | Fox, Jr. ................................. 188/314 |
| 4,934,667 | 6/1990 | Pees et al. ........................ 267/64.21 |
| 4,971,344 | 11/1990 | Turner ................................. 280/276 |
| 5,186,481 | 2/1993 | Turner ................................. 280/276 |
| 5,271,485 | 12/1993 | Yowell et al. ........................ 188/317 |
| 5,456,480 | 10/1995 | Turner et al. ........................ 280/276 |
| 5,580,075 | 12/1996 | Turner et al. ........................ 280/276 |
| 5,682,966 | 11/1997 | Cabrerizo-Pariente . |
| 5,775,677 | 7/1998 | Englund ................................ 188/317 |
| 5,810,130 | 9/1998 | McCandless ........................ 188/322.22 |
| 5,984,060 | 11/1999 | Clark et al. ........................ 188/322.16 |

OTHER PUBLICATIONS

1999 Sid XC, SL and XL Owner's Manual, Rock Shox® pp. 1–21.

*Primary Examiner*—Christopher P. Schwartz
*Attorney, Agent, or Firm*—Townsend and Townsend and Crew LLP

[57] ABSTRACT

A gas spring shock absorber (10A) includes a damping fluid cylinder (14A) telescopically housed within an air cylinder (12A). A shaft (16A) connects a sealable, outer end (18A) of the air cylinder with a vented piston (32A) movably mounted within the damping fluid cylinder. A first fluid seal (60) extends from the gas cylinder and contacts the outer surface (38A) of the damping cylinder while a second fluid seal (34A) extends from the damping cylinder and contacts the inner surface (36A) of the gas cylinder. The fluid seals create a sealed variable-volume air chamber (40A) which is divided into air positive and air negative spring chambers (62,64). The air negative spring chamber is defined between the two fluid seals and automatically balances the force on the damping unit from the pressurized gas in the first air chamber portion. A bypass channel (66) is provided to permit fluid to bypass the second fluid seal and automatically equalize the pressure in the air positive and air negative spring chambers when the second fluid seal is aligned therewith.

9 Claims, 2 Drawing Sheets

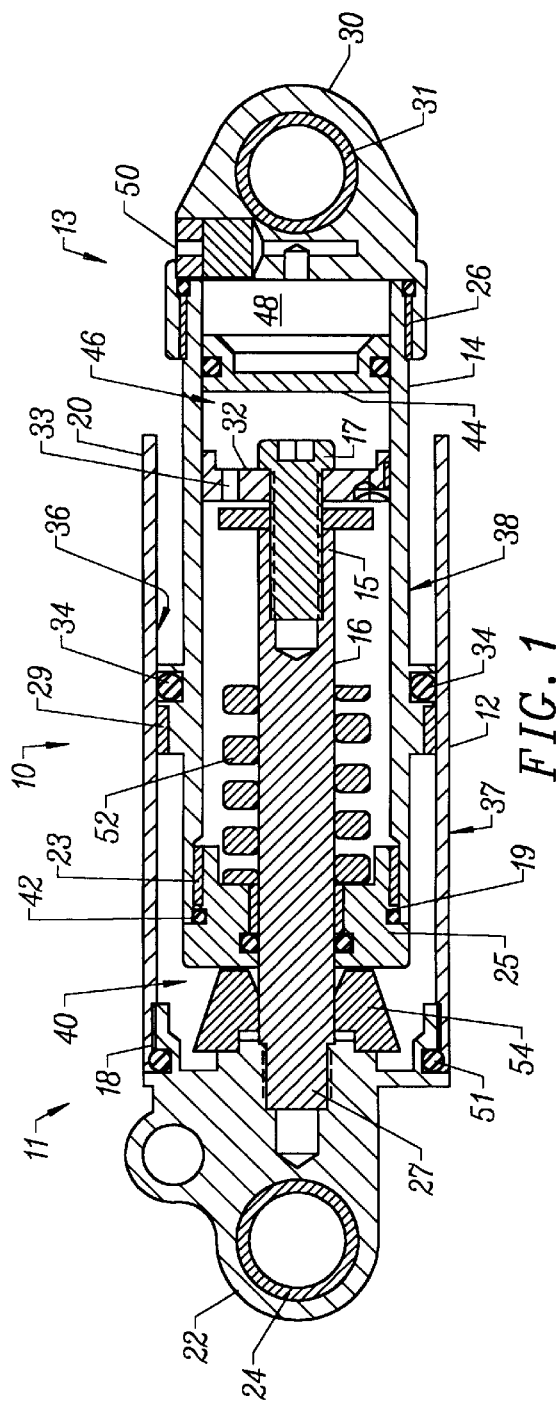
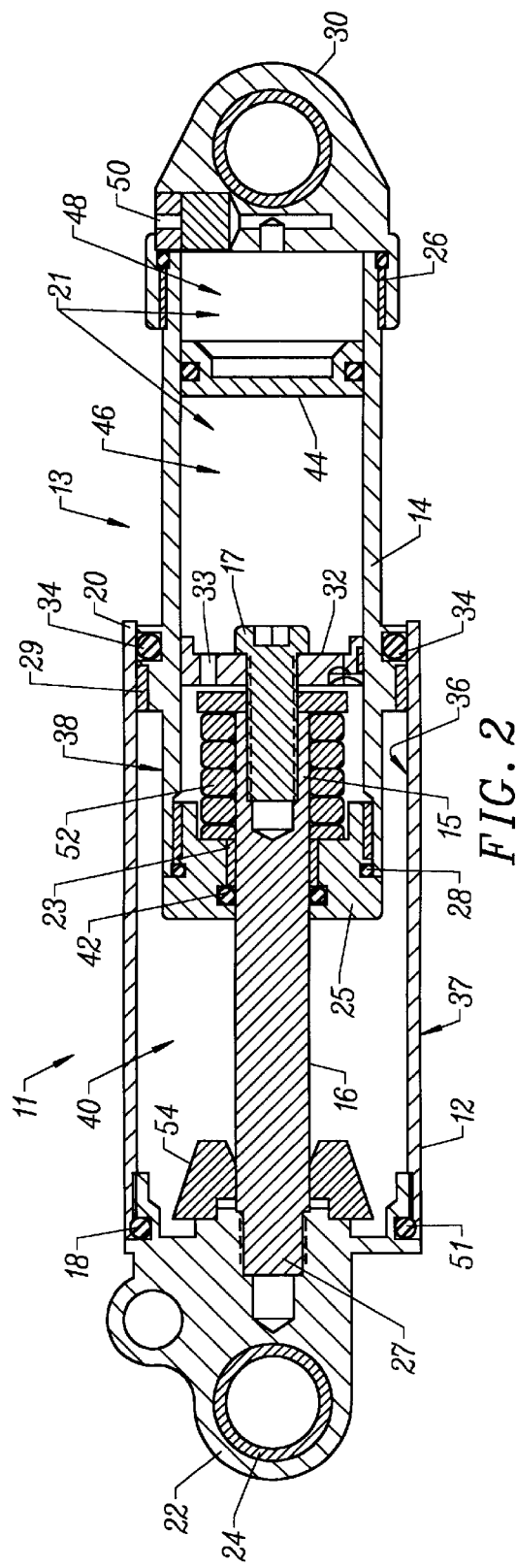

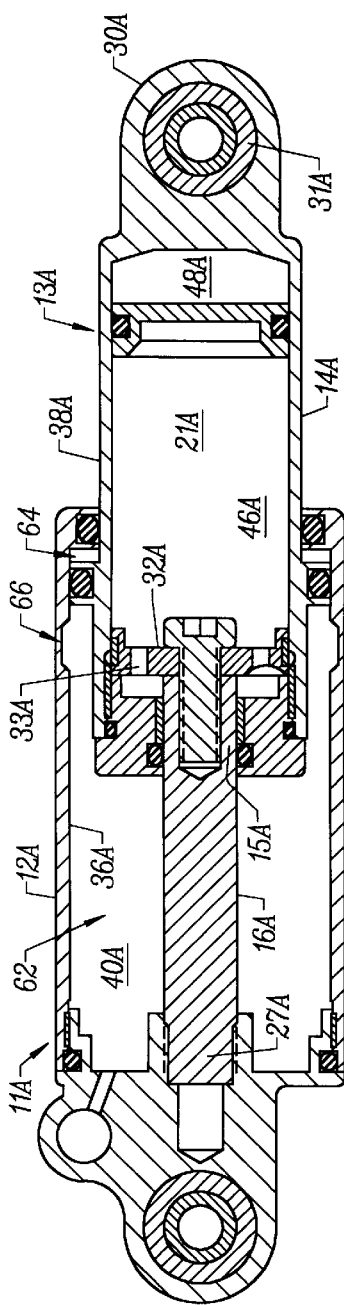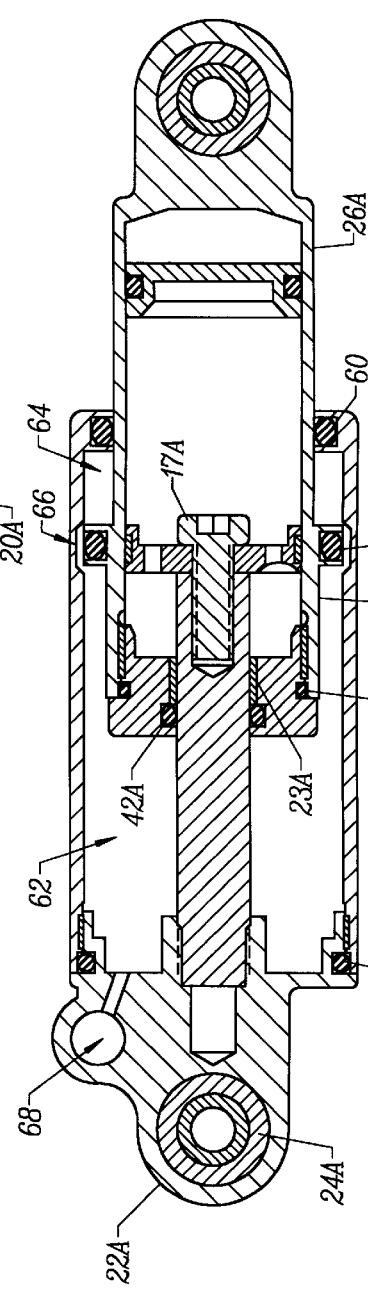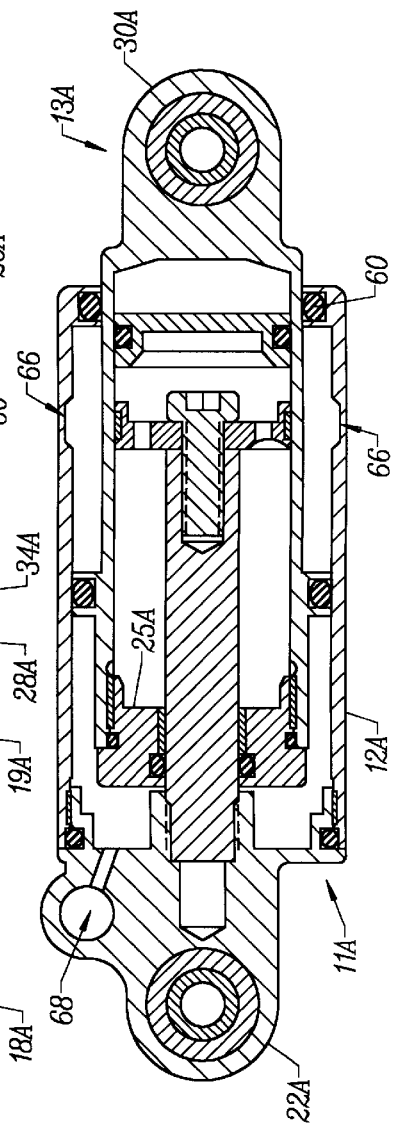

SHOCK ABSORBER WITH POSITIVE AND NEGATIVE GAS SPRING CHAMBERS

CROSS-REFERENCE TO RELATED APPLICATIONS

This application is related to (1) U.S. patent application No. 09/201,632, filed Nov. 30, 1998, entitled "Shock Absorber With External Air Cylinder Spring," and (2) U.S. Provisional Patent Application No. 60/073,478 filed Feb. 3, 1998, the disclosures of which are incorporated by reference.

BACKGROUND OF THE INVENTION

The present invention relates to shock absorbers.

Conventional automotive vehicles typically have separate suspension springs and separate simple shock absorbers. Simple shock absorbers, which provide damping only, are typically oil-filled cylinders within which a vented piston is mounted. The piston is connected to a shaft which extends out of one end of the cylinder. The outer end of the shaft is mounted to one point on the vehicle; the other end of the cylinder is mounted to another point on the vehicle so that the shock is parallel to the action of the suspension spring.

Another type of shock absorber, which is the type commonly used with motorcycles, off-road vehicles, competition automotive vehicles and off-road bicycles, combines at least part of the suspension function and the shock absorbing function in one unit. This second type of shock absorber commonly uses a spring unit to provide all or part of the suspension function coupled with a damping unit to provide the damping function. Conventional shock absorber designs commonly incorporate an external coil spring, an internal air spring, or an internal bladder to provide the suspension function.

SUMMARY OF THE INVENTION

The present invention uses positive and negative gas spring chambers to provide a shock absorber which is much lighter than conventional metal coil spring designs. The invention is also simpler in construction than many conventional shock absorbers. Also, the use of an air cylinder with a bypass channel simplifies modification of the spring rate of the shock.

The shock absorber includes a damping unit with a damping fluid cylinder telescopically housed within a gas cyclinder of a gas cylinder unit. A shaft connects a sealable, outer end of the gas cylinder unit to a vented piston movably mounted within damping fluid cylinder. The shaft passes through a sealed inner end of damping unit. A sliding seal, carried by the gas cylinder unit in sliding contact with the damping fluid cylinder, creates a sealed, variable-volume gas (typically air) chamber between the cylinders. A second fluid seal is carried by the damping unit in sliding contact with the inner surface of the gas cylinder to divide the air chamber into first and second air chamber portions, also called air positive and air negative spring chambers. The second air chamber portion is defined between the two fluid seals and acts as an air negative spring to automatically help balance the force on the damping unit from the pressurized gas in the first air chamber portion. A bypass channel can be provided to permit fluid to bypass the second fluid seal when the second fluid seal is at a chosen position.

An advantage of the invention is that it is relatively simple in construction and requires the use of no heavy metal coil springs. That is, there is no need to use external metal coil suspension springs because that (positive) spring function is provided by the air positive spring effect created by the air positive spring chamber. The air negative spring chamber eliminates the need for an internal metal coil spring, which is commonly used to cushion the forces on the shock when the shock is fully extended at the end of a rebound stroke.

The air negative spring chamber not only absorbs some of the impact during full rebound movements, but also ensures that at the end of a rebound stroke the shock is in an equilibrium state. The pressurized gas within the air positive spring chamber keeps extending the shock during the rebound stroke until the gas compressed within the air negative spring chamber is at a sufficiently high pressure to balance out the air positive spring chamber force. Thus, unlike metal coil springs, the air negative spring chamber typically will not bottom out (create metal-to-metal contact) as can occur with conventional internal metal coil springs; extension of the shock absorber continues to compress the gas within the air negative spring chamber thus increasing the pressure within the chamber to higher and higher levels. This ensures that when the shock is at full extension, the compression stroke can start with very little force because the forces on the shock are automatically balanced.

The use of the bypass channel eliminates the need to separately pressurize the air negative spring chamber and the air positive spring chamber. Rather, the desired pressure is provided to the sealable air chamber; once the second sliding seal is at the correct position, the bypass channel allows the air to bypass the second seal thus temporarily equalizing the pressure within the air positive and air negative air chambers. The bypass channel automatically compensates for any change in the amount of air (or other gas) in the sealable air chamber.

The present invention finds particular utility for use with on- and off-road vehicles. However, the invention can also be used for other shock-absorbing tasks, such as instrument mounting structures and transportation vibration isolators.

Other features and advantages of the present invention will appear from the following description in which the preferred embodiments have been set forth in detail in conjunction with the accompanying drawings.

BRIEF DESCRIPTION OF THE DRAWINGS

FIG. 1 is a sectional side elevation view of a shock absorber with an external air cycling spring in a fully collapsed or compressed state;

FIG. 2 is a sectional side elevation view of the shock absorber of FIG. 1 in a fully extended state;

FIG. 3 is a sectional side elevation view of a shock absorber made according to the present invention, including an air negative spring, shown in a fully-extended condition at the end of a rebound stroke;

FIG. 4 illustrates the shock absorber of FIG. 3 with the second sliding seal aligned with the bypass channel allowing the pressure in the air positive and air negative spring chambers to equalize; and FIG. 5 illustrates the shock absorber of FIG. 4 in a fully-collapsed or compressed state at the end of a compression stroke.

DESCRIPTION OF THE SPECIFIC EMBODIMENTS

The shock absorber of FIGS. 1 and 2 includes an air positive spring chamber and an internal negative metal coil spring. The FIGS. 1 and 2 shock absorber is described first so to better understand the features of a shock absorber made according to the present invention which is illustrated in FIGS. 3–5.

As is shown in FIGS. 1 and 2, shock absorber 10 comprises a gas cylinder unit 11 and a damping unit 13, with the damping unit 13 being telescopically housed in gas cylinder unit 11. Gas cylinder unit 11 includes an air cylinder 12, having first and second ends 18 and 20, respectively, and a first mounting element 22 threadably mounted to, and sealing, first end 18. Damping unit 13 includes a damping cylinder 14, having first and second ends, 26 and 28, respectively, and a second mounting element 30 sealing first end 26. Units 11 and 13 are coupled together by a shaft 16, having a first end 27 which is secured to mounting element 22. Shaft 16 passes through a cap 25 threadably mounted to second end 28 of damping cylinder 14; an O-ring 19 is used to provide a fluid seal adjacent to the threads joining cap 25 and end 28 of cylinder 14.

First and second mounting elements 22, 30 include bearings 24, 31 by which the shock absorber is secured to appropriate vehicle elements (not shown). Second air cylinder end 20 is open. Second mounting element 30 is attached to and seals off first end 26 of damping cylinder 14.

A dynamic or sliding seal 34 and a bearing 29 are used between inner surface 36 of air cylinder 12 and outer surface 38 of damping fluid cylinder 14 so as to create a sealed air chamber 40 therebetween. This sealed air chamber 40 acts as an external air cylinder spring. An advantage of the present seal 34 and bearing 29 is that they ride on inner surface 36 of air cylinder 12, which prevents the sealing surface from becoming easily damaged. In addition, as only one large diameter seal 34 is required to completely seal air chamber 40, friction is greatly reduced from that seen in existing systems.

A vented piston 32 is secured to end 15 of shaft 16 by a bolt 17. Piston 32 has a vent bore 33 formed therethrough and is movably mounted within the damping fluid cylinder 14. Shaft 16 connects vented piston 32 to first mounting element 22 so that as shock absorber 10 extends and collapses, shaft 16 causes vented piston 32 to move back and forth within the interior 21 of damping fluid cylinder 14. In alternative embodiments, vented piston 32 can be replaced by other motion damping elements keeping within the scope of the present invention.

Damping cylinder 14 also preferably includes a floating piston 44. Floating piston 44 divides interior 21 of damping cylinder 14 into a damping fluid chamber 46, housing vented piston 32 and a gas chamber 48. Gas chamber 48 is sealable, and is filled with a gas that acts as a spring, resisting compression by piston 44. Fluid chamber 46 is filled with a damping fluid, typically oil, thus damping the extension and collapse of the shock absorber.

Shaft 16 passes through a sleeve bearing 23 and a seal 42 captured between cap 25 and shaft 16 at second end 28 of damping cylinder 14. Seals 28 and 42 prevent damping fluid from flowing into air cylinder 12.

As shock absorber 10 extends and collapses, the volume of shaft 16 which is housed within damping fluid chamber 46 of damping cylinder 14 changes. This change in the volume of shaft 16 projecting into damping fluid chamber 46 is accommodated by movement of floating piston 44. Such movement of floating piston 44 increases or decreases the pressure within gas chamber 48. It is to be understood that movable seal structures other than floating pistons to accommodate the change in volume can also be used, such as bellows, diaphragms or bladders. The gas volume within the gas chamber 48 of damping fluid cylinder 14 can have its pressure adjusted, typically by way of a pressurization port 50 which is formed in second mounting element 30.

Air cylinder 12 is preferably threaded to the first mounting element 22 to permit easy servicing. That is, first end 18 of air cylinder 12 can be simply unthreaded from the first mounting element 22 to provide access to seal 34 without the need to access the internal damping components or recharging gas chamber 48. A fluid-tight seal between end 18 and element 22 is aided by the use of an O-ring 51.

As shock absorber 10 expands from its compressed state as shown in FIG. 1 to its naturally expanded state shown in FIG. 2, a spring 52 operates to cushion the impact of vented piston 32 against cap 25 which threadably seals end 28 of damping unit 13. The air cylinder 12 also includes a snubber 54, preferably made of rubber or urethane, which is used to cushion the impact of the dampening cylinder 14 against air cylinder 12 when shock absorber 10 is fully collapsed.

One of the primary advantages of shock absorber 10 is that it is much lighter than conventional external metal coil spring designs and is much simpler and compact than air bladder designs. Moreover, while air chamber 40 is, in this embodiment, filled with air, it could be filled with some other gas and could include a pressurization port (not shown) similar to that used at second mounting element 30.

The suspension function of shock absorber 10 is provided by both air chamber 40 in air cylinder 12 and by gas chamber 48 in damping cylinder 14. If the gas chamber 48 is vented to atmosphere, the entire suspension function would be provided by the external air cylinder spring of air chamber 40. Accordingly, a further advantage of shock absorber 10 is that changing the pressure within gas chamber 48 does not affect damping but merely affects the preload, which is determined by a combination of any preload provided by the external air chamber 40 and any preload provided by the gas chamber 48. Gas chamber 48 is preferably pressurized with nitrogen. An advantage of using nitrogen over air is that nitrogen is cleaner and is less sensitive to temperature changes.

Air chamber 40 and/or gas chamber 48 can be pressurized with different amounts of gas to change the initial spring resistance, known as sag, preload, or droop. Doing so does change the spring rate. In contrast, with a conventional coil spring shock absorber, the spring would have to be replaced to change the spring rate. Another advantage of air springs over coil springs is that air springs will not take a set (ie: change its unloaded length after use) as coil springs can.

Another advantage of shock absorber 10 relates to the preferred use of threads to mount elements 18, 22, 28 to air and damping cylinders 12, 14. This aids in manufacture (cylinders 12, 14 are uncomplicated), assembly and maintenance of the shock absorber.

In use, shock absorber 10 can be constructed by providing a gas cylinder 12 and a damping cylinder 14. Mounting element 22 is threadably mounted to end 18 of gas cylinder 12. Snubber 54 and end 27 of shaft 16 are then mounted against and into mounting element 22, respectively. Seal 42 and sleeve bearing 23 are then received into cap 25. Cap 25 is then threadbly mounted to seal end 28 of damping cylinder 14. Spring 52 and vented piston 32 are then positioned in damping cylinder 14 as end 15 of shaft 16 is received through cap 25. End 28 of damping cylinder 14 is then telescopically received into open end 20 of air cylinder 12 with seal 34 and bearing 29 operating to provide a sealed air chamber 40. Bolt 17 is then tightened such that vented piston 32 is secured to shaft 16. A damping fluid is then received into damping cylinder 14 and a floating piston 44 is then received into damping cylinder 14, separating damping fluid chamber 46 from gas chamber 48. Mounting element 30 is then threadbly received over end 26 of damping cylinder 14, sealing gas chamber 48. The pressurization of gas chamber 48 can then be adjusted by way of pressurization port 50. Lastly, mounting elements 22 and 30 are then attached to different vehicle elements, to provide motion damping therebetween.

During operation, mounting ends 22 and 30 will be displaced toward one another. This displacement motion will be resisted by the movement of damping cylinder 14 into air cylinder 12 increasing the pressure in air chamber 40. This displacement motion will also be resisted by the movement of vented piston 32 (carried by shaft 16) through damping fluid chamber 46 in damping cylinder 14. The displacement of shaft 16 into damping fluid chamber 46 will be accommodated by movement of floating piston 44, compressing gas chamber 48. Shock absorber 10 will tend to spring back to an extended position due to the pressurization of air chamber 40 and gas chamber 48. Spring 52 then operates to cushion the impact of vented piston 32 as it moves toward cap 25.

Another purpose of spring 52 is to balance the force on damping unit 13 when in an equilibrium position. Assume shock absorber 10 is not attached to anything. The equilibrium position of damping unit 13 relative to gas unit 11 will likely be somewhere between the two positions shown in FIGS. 1 and 2 with spring 52 partially compressed. Increasing the air pressure within chamber 40 will tend to push damping unit 13 to the right in the figures thus extending the shock. The distance damping unit 13 moves will depend upon the spring rate of spring 52. Once spring 52 has been compressed sufficiently to balance the air pressure force exerted on damping unit 13, the damping unit will stop moving to the right and remain at an equilibrium position. Under these circumstances, initial collapse (compression) of the shock absorber will be aided by the tendency of spring 52 to expand. Because the force of spring 52 tends to be the opposite of the suspension force provided by sealed air chamber 40, this spring force from spring 52 is considered a negative spring force. Providing this negative spring force permits beginning the compression stroke with very little additional force. If this were not true, such as if spring 52 were either not present or if spring 52 were fully compressed, a much greater force would need to be exerted before damping unit 13 would begin moving towards its fully compressed state during a compression stroke.

FIGS. 3, 4, and 5 illustrate a shock absorber 10A which is very similar to shock absorber 10 of FIGS. 1 and 2 with like reference numerals referring to like elements. The primary difference between the two is that the design of shock absorber 10A eliminates the need for metal coil spring 52.

Second end 20A of air cylinder 12A defines an annular groove housing an O-ring seal 60 which slidably engages outer surface 38A of damping cylinder 14A. Doing so creates an air positive spring chamber 62 between sliding seal 34A and first mounting element 22A and an air negative spring chamber 64 between sliding seal 34A and O-ring seal 60. A bypass channel 66 is formed as a circumferential groove along inner surface 36A of air cylinder 12A. First mounting element 22A includes a sealable pressurization valve 68 to permit the introduction of the desired amount of air or other gas into chamber 40A and thus into air positive and air negative chambers 62 and 64.

FIG. 3 illustrates shock absorber 10A with sealed air chamber 40A pressurized to desired air pressure. Assuming air positive spring chamber 62 is at 200 psi in the state of FIG. 3, air negative spring chamber 64 will have a pressure of about 500 psi so that the forces exerted on damping unit 13 by the gases within sealed air chamber 40A are equal even though the areas subjected to the differing pressures vary, in this case about 2½ to 1. In the partially compressed state of FIG. 4, sliding seal 34A has reached bypass channel 66 which permits compressed air to bypass the sliding seal thus equalizing the pressure within chamber 62, 64. Of course the pressure on damping unit 13A at this point createsis a significant force to the right in FIG. 4. At the end of the compression stroke in the state of FIG. 5, sliding seal 34A has passed bypass channel 66 so that the pressure within air positive spring chamber 62 is greater than the pressure in air negative spring chamber 64. During the rebound stroke, during which the shock moves from the state of FIG. 5 towards the state of FIG. 3, the pressure in the two spring chamber 62, 64 is again equalized as sliding seal 34A passes bypass channel 66. Continued movement of gas cylinder 11A to the left reseals air negative spring chamber 64 to thus cause the gas within chamber 64 to be further compressed. Once the forces are balanced, including the forces exerted at first and second mounting elements 22A, 30A and the forces exerted through gas chamber 48A and through air positive and negative spring chambers 62, 64, an equilibrium state is automatically achieved.

Providing air negative spring chamber 64 automatically permits an equilibrium condition to be achieved at the end of the rebound stroke because continued extension of shock absorber 10 continues to compress the gas within chamber 64 until the forces are balanced. Therefore, the initial compression or collapse of shock absorber 10A during the initial movements of shock absorber at the beginning of a compression stroke requires very little force to begin this movement; if the forces were not balanced, such as could occur with shock absorber 10 shown in FIG. 2 if spring 52 were fully compressed at the end of the rebound stroke, the extra loading would need to be overcome before the shock absorber could begin its compression stroke.

In addition to the above advantages, it will not matter if air positive spring chamber 42A is initially pressurized to 100 psi or 300 psi, by properly positioning the location of bypass channel 66, air negative spring chamber 64 will automatically be provided with the appropriate gas pressure to provide the desired negative spring effect after one stroke or cycle of the shock absorber. Also, only a single valve 68 need be used to change the overall spring rate of the shock absorber.

Modification and variation can be made to the disclosed embodiment without departing from the subject of the invention as defined in the following claims. For example, instead of an annular groove defining bypass channel 66, bypass channel 66 could be created by a U-shaped channel formed within the wall of air cylinder 12A and having axially spaced-apart ends opening into air channel 40A. Further, a number of different bypass channels could be provided permitting the user to selectively seal all of the bypass channels except one to permit the relative volumes of chambers 62, 64 at a pressure-equalized state, such as that provided in the state of FIG. 4, to be changed.

What is claimed is:

1. A shock absorber comprising:
   a gas cylinder unit comprising a gas cylinder with first and second gas cylinder ends, said first gas cylinder end being closed;
   a damping unit comprising:

a damping fluid cylinder having an outer surface and first and second damping cylinder ends;

a movement damping element movably mounted within the damping fluid cylinder; and said second end of the damping fluid cylinder telescopically housed within the gas cylinder;

a shaft connecting the movement damping element and the gas cylinder unit;

a first sliding seal carried by the gas cylinder unit and in sliding fluid-sealing contact with the outer surface of the damping fluid cylinder and creating a sealed gas chamber within the gas cylinder; and a second sliding seal carried by the damping unit in sliding fluid-sealing contact with the inner surface of the gas cylinder to divide the gas chamber into first and second gas chamber portions, the first gas chamber portion defined between the second sliding seal and the first end of the gas cylinder, the second gas chamber portion defined between the first and second sliding seals;

whereby the second gas chamber portion acts as an air negative spring to automatically balance the force on the damping unit when the gas pressure within the gas chamber is above an ambient pressure so the shock absorber is in an equilibrium condition.

2. The shock absorber of claim 1, further comprising a bypass channel formed in the gas cylinder to permit fluid to bypass the second sliding seal when the second sliding seal is at a chosen position along the gas cylinder.

3. The shock absorber of claim 1, further comprising means for equalizing the pressure in the first and second gas chamber portions when the second sliding seal is at a chosen position along the gas cylinder.

4. The shock absorber of claim 1, wherein the movement damping element comprises a vented piston movably mounted within the damping fluid cylinder.

5. The shock absorber of claim 1, further comprising means for accommodating movement of said shaft into and out of the damping fluid cylinder.

6. The shock absorber of claim 5, wherein said means for accommodating movement comprises a floating piston slidably movable in said damping fluid cylinder, and said floating piston separating said damping fluid cylinder into a fluid chamber and a second gas chamber.

7. The shock absorber of claim 1, wherein the gas cylinder includes a pressurization port in selective fluid communication with the first gas chamber portion.

8. The shock absorber of claim 1, further comprising a sliding fluid seal between the shaft and the damping fluid cylinder.

9. A shock absorber comprising:

a gas cylinder unit comprising a gas cylinder with a pressurization port and first and second gas cylinder ends, said first gas cylinder end being closed;

a damping unit comprising:

a damping fluid cylinder having an outer surface and first and second damping cylinder ends;

a movement damping element movably mounted within the damping fluid cylinder; and said second end of the damping fluid cylinder telescopically housed within the gas cylinder;

a shaft connecting the movement damping element and the gas cylinder unit;

a first sliding seal carried by the gas cylinder unit and in sliding fluid-sealing contact with the outer surface of the damping fluid cylinder and creating a sealed gas chamber within the gas cylinder;

a second sliding seal carried by the damping unit in sliding fluid-sealing contact with the inner surface of the gas cylinder to divide the gas chamber into first and second gas chamber portions, the first gas chamber portion defined between the second sliding seal and the first end of the gas cylinder, the second gas chamber portion defined between the first and second sliding seals; and a bypass channel formed in the gas cylinder to permit fluid to bypass the second sliding seal when the second sliding seal is at a chosen position along the gas cylinder;

whereby the second gas chamber portion acts as an air negative spring to automatically balance the force on the damping unit when the gas pressure within the gas chamber is above an ambient pressure so the shock absorber is in an equilibrium condition.

* * * * *